US006554246B1

(12) United States Patent
Nadakatti et al.

(10) Patent No.: US 6,554,246 B1
(45) Date of Patent: Apr. 29, 2003

(54) CASTING OF SHAPED SOFT SOLID ARTICLES

(75) Inventors: Suresh Murigeppa Nadakatti, Mumbai (IN); Vijay Mukund Naik, Mumbai (IN)

(73) Assignee: Lever Brothers Company, division of Conopco, Inc., New York, NY (US)

(*) Notice: Subject to any disclaimer, the term of this patent is extended or adjusted under 35 U.S.C. 154(b) by 0 days.

(21) Appl. No.: 09/074,179

(22) Filed: May 7, 1998

(30) Foreign Application Priority Data

May 9, 1997 (GB) ............................................ 9709500

(51) Int. Cl.[7] .......................... B29C 39/38; B29C 39/26

(52) U.S. Cl. ....................... 249/104; 249/105; 249/111; 249/140; 249/170; 249/172

(58) Field of Search .......................... 249/79, 104, 105, 249/117, 138, 140, 170, 172, 111, 108

(56) References Cited

U.S. PATENT DOCUMENTS

| | | | | | |
|---|---|---|---|---|---|
| 39,189 | A | * | 7/1863 | Williamson | 249/105 |
| 170,464 | A | * | 11/1875 | Bakewell, Jr. | 249/170 |
| 816,315 | A | * | 3/1906 | Haggenjos | 249/170 |
| 845,668 | A | * | 2/1907 | Sweet, Jr. | 249/105 |
| 1,149,842 | A | * | 8/1915 | May et al. | 249/108 |
| 1,698,836 | A | * | 1/1929 | Bartley et al. | 249/170 |
| 1,910,015 | A | * | 5/1933 | Homand | 249/111 |
| 2,330,277 | A | * | 9/1943 | Fritschle | 249/170 |
| 2,922,255 | A | * | 1/1960 | Broderick et al. | 249/111 |
| 2,987,484 | A | | 6/1961 | Lundberg | |
| 3,016,574 | A | | 1/1962 | Fischer | |
| 3,034,177 | A | | 5/1962 | Hooper | |
| 3,149,188 | A | | 9/1964 | Schmitt | |
| 3,416,766 | A | * | 12/1968 | Miller | 249/79 |
| 3,788,590 | A | * | 1/1974 | Hasselbach | 249/95 |
| 3,844,753 | A | * | 10/1974 | Huebner | 249/79 |
| 4,035,122 | A | * | 7/1977 | Cavanaugh | 425/84 |
| 4,344,529 | A | * | 8/1982 | Ibarzabal | 249/170 |
| 4,809,945 | A | * | 3/1989 | Roussel | 249/136 |
| 4,885,108 | A | * | 12/1989 | Richter | 249/117 |
| 4,966,544 | A | * | 10/1990 | Mitake | 249/79 |
| 5,087,188 | A | * | 2/1992 | Staver | 425/116 |

FOREIGN PATENT DOCUMENTS

| | | | |
|---|---|---|---|
| EP | 0366209 | | 5/1990 |
| EP | 0493197 | A1 | 7/1992 |
| EP | 0507559 | A2 | 10/1992 |
| FR | 910256 | A | 6/1946 |
| JP | 61-26699 | | 5/1986 |

OTHER PUBLICATIONS

International Search Report Application No. PCT/EP 98/02579 mailed Sep. 3, 1998.

* cited by examiner

*Primary Examiner*—Duane S. Smith
(74) *Attorney, Agent, or Firm*—Ronald A Koatz

(57) ABSTRACT

A mould for casting shaped, solid detergent articles is provided. The mold is made of two rigid complimentary dies which upon engagement define a cavity corresponding to a desired shape of the cast article, wherein the engaged dies form a reservoir which on one side is open to receive cast melt and on another side is open to the cavity.

8 Claims, 3 Drawing Sheets

CASTING OF SHAPED SOFT SOLID ARTICLES

CROSS-REFERENCE TO RELATED APPLICATIONS

The invention claims priority under 35 USC §119 to United Kingdom application No. 9709500.4, filed May 9, 1997.

The present invention relates to a mould for individual casting of soft solid articles. The invention more particularly refers to essentially a split cavity mould comprising of at least two rigid dies. Another aspect of the invention relates to a process of casting a melt in such said moulds for individually producing shaped articles of soap and/or non-soap detergent.

BACKGROUND OF THE INVENTION

1. Field of the Invention

The subject invention relates to soap bars made using bar casting technology and to molds used in the casting of the bars. In particular, the invention relates to rigid complimentary dies defining a cavity and used for making shaped, solid detergent articles.

2. Description

Soap or non-soap detergent articles are traditionally produced by shear working/homogenisation of the formulation followed by extrusion and stamping. This procedure is only suitable for detergent bar formulations which are thermoplastic or which are not shear sensitive. While some transparent soap formulations can be produced by this route many other formulations which are very shear sensitive can not be so produced in bar form and special processing techniques have to be employed for their manufacture, known examples of which are given below.

Casting of a Melt into Bars:

This process is employed for producing highly transparent soaps. The technology presently employed involves many manufacturing operations such as casting of molten soap into long bars of desired cross section (Schist moulds), cooling, bar ejection, bar maturation, billeting, chamfering, billet maturation and stamping to produce individual transparent soap tablets. Although the maturation time may be reduced or completely eliminated by employing certain formulation variations, overall this process is highly labour intensive and is very expensive.

Casting in Pack:

This process involves casting a molten soap blend into a shaped transparent pack or sachet, in which it is solidified and sold as such. Although highly transparent soaps can be produced by this technology, the process is very expensive and maturation, if required, is very slow.

Individual Casting in Flexible Moulds:

Individual casting of transparent soap tablets has been disclosed in JP 61026699 (Kanebo, Ltd., 1984). This describes a method involving casting a melt into a "thin moulding plate" which is flexible or elastic and is made of synthetic resins. This disclosure simplifies the manual operations involved in the conventional technology of making transparent soaps by eliminating the steps of billeting, chamfering, stamping and polishing. However, the process has inherent disadvantages such as unattractive and non-reproducible appearance/shape of tablets, poor surface finish and shorter mould life.

It is therefore an object of the present invention to provide a rigid two part split mould for individual casting of solid shaped detergent articles such as soap/non-soap detergent tablets which gives an unblemished and bubble free product in a form that is dictated by the shape of the mould. Furthermore the mould is designed for efficient cooling of the cast article.

BRIEF SUMMARY OF THE INVENTION

Thus, the present invention provides a mould for casting shaped, solid detergent articles, comprising at least two rigid complimentary dies which upon engagement define a cavity corresponding to a desired shape of the cast article, wherein the engaged dies form a reservoir which on one side is open to receive cast melt and on another side is open to the cavity.

The reservoir opens on one side to the cavity and on the other side has a feed opening to fill the mould. Preferrably, the die is designed in a manner such that the volume ratio of the reservoir to the cavity is at least 5%. Leakage of liquid from the mould is prevented by the engagement of the two dies.

Optionally the inside surface of the said cavity is provided with mirror images of inscriptions desired on the surface of the cast article. The said dies are preferably hinged, and the external surface of the said dies is preferably provided with means to improve cooling of the mould after casting, such as fins/ribs for air cooling or jackets for circulation of a coolant liquid. The thickness and width of the rim are so designed that the cooling takes place relatively faster in the region of the rim.

According to a further aspect of the invention, a process is provided for the manufacture of solid shaped detergent articles comprising the steps of:

i. making a melt of the composition to be cast;

ii. pouring the said melt into the above described mould;

iii. cooling the mould to promote solidification;

iv. demoulding the solidified shaped article.

Preferrably, the mould is preheated before the melt is poured therein such that the internal surface of the mould is at a temperature above the solidification temperature of the melt.

The process is suitable for manufacturing shaped detergent articles such as tablets of soap and/or non-soap detergent, for example for personal washing or for washing fabric.

Most particularly the process may be used for manufacturing transparent tablets for personal wash. Depending on the formulation and the desired transparency of the product, such tablets are preferably matured after demoulding.

The process may be carried out in a continuous manner by having a plurality of moulds circulating through a melt feeding station where each mould is filled with the melt and subsequently taken through the steps of cooling to complete solidification and demoulding before being recycled again.

DETAILED DESCRIPTION OF THE INVENTION

Figure 2:
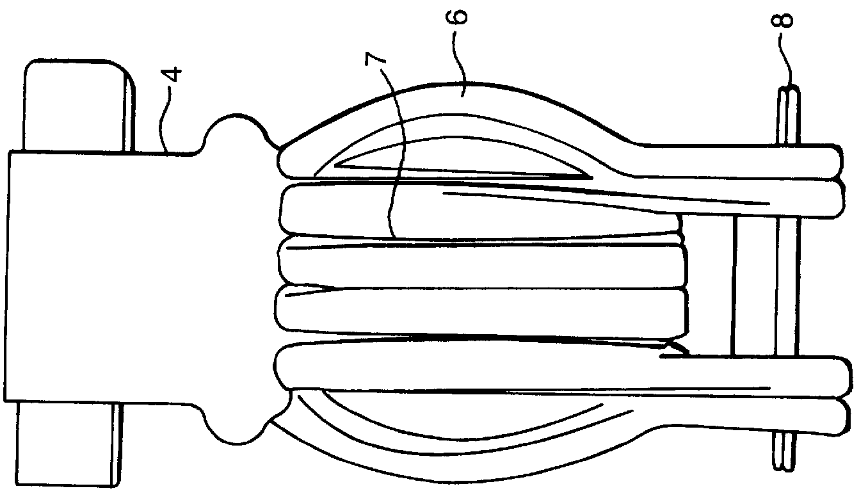
FIG. 2 shows the external construction of the mold.

1. Description of the Mould:

The mould comprises of two rigid complementary dies adapted to be fitted to each other. The dies of the mould are manufactured from any rigid material with high thermal conductivity preferably metals such as aluminium and its alloys. Each die is provided with an internal surface, the size and shape of which may vary depending on form of the final product. The dies when in engagement along the rim define a cavity corresponding to the total shape of the cast article. Typically for a soap tablet of 15 g to 150 g the volume of the total cavity would range from 10 to 170 ml and the shape may be circular, oval, square, rectangular or any other form as desired. The inside surface of the cavity may be flat, concave or convex or any other as desired. Preferably, the inside surface of the said cavity is coated with a material having a lower surface energy than the moulded detergent bar. That is, the cavity defining surfaces of the dies are coated with a material having lower surface energy than the cast article.

The inside surface of the cavity is optionally provided with mirror images of inscriptions such as lettering or figures desired on the surface of the cast article, either as projections or depressions. To ensure easy detachment of the article from the mould without distortion or damage to the inscription on the article the inscription is preferably designed such that the rim of the mirror images of the inscription is not exactly perpendicular to the die surface, but is appropriately bevelled. To further prevent distortion or damage to the inscription the mirror image of the inscription on the inner die surface should be free from burrs and blemishes and preferably be carefully polished.

The volume ratio of the reservoir to the cavity is at least 5%, preferably at least 10%, more preferably at least 20%. The volume ratio is preferrably no greater than 50%, more preferrably no greater than 40%. Leakage of the liquid from the mould is prevented by having the joining surfaces of the die closely matching, e.g. by lapping or by providing a gasket. Leakage of the liquid can further be prevented by designing the width and thickness of the rim such that rapid cooling and solidification can take place in the region of rim for self sealing action eliminating the need for the use of a gasket. The external surface of the dies can be provided with means to enhance the cooling efficiency, such as fins/ribs. Optionally, the outside surfaces of the dies could be jacketed so that a coolant can be circulated to enhance cooling of the mould after casting. The mould is preferably hinged to facilitate the opening of the dies allowing release of the hardened tablet.

The reservoir may also form a unit that is removable from the rest of the mould, so that such removal cleanily cuts any material still remaining in the reservoir away from the cast material.

2. Description of the Process for Making a Transparent Soap:

A mixture is made of soap and a solvent or solvent blend. Suitable solvents are e.g. glycerol, sorbitol, etc. The mixture is melted to form an isotropic solution. The mould is preferably preheated to a temperature above the solidification temperature of the melt. The molten mixture is poured into the mould such that the cavity is completely and the reservoir is sufficiently filled. The mould is cooled to a temperature ranging from 0–50° C., depending upon the solidification point of the formulation to achieve solidification of soap. The hardened soap is taken out of the mould either mechanically e.g. a vacuum arm mechanism or manually. The portion of the soap which has solidified in the reservoir is chopped off from the tablet.

For transparent soaps requiring maturation, the solvent or solvent blend comprises of a volatile solvent, e.g., a monohydric alcohol such as ethanol. In that case the tablets are allowed to mature for a sufficient period e.g. 6–12 weeks to develop maximum transparency.

Figure 1:
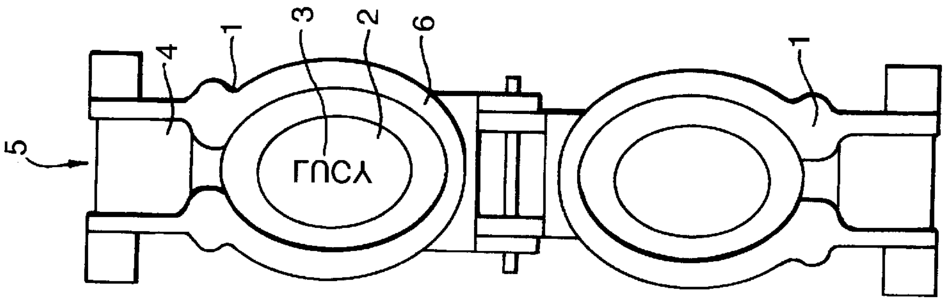
FIG. 1 shows the internal construction of the mold.

The moulds of the present invention will now be illustrated with reference to accompanying drawings, in which FIG. 1 shows the internal construction of the mould and FIG. 2 shows the external construction of the mould according to the present invention.

Referring to FIG. 1, the dies(1) of the mould are manufactured from aluminium. Each die is provided with half-a-cavity(2) of volume ~60 ml. The inside surface of the half-cavity is convex and is provided with mirror images of the inscriptions(3) desired on the surface of the cast article as projections. When the two dies are joined the cavity formed corresponding to the final shape of the cast article is open to the reservoir(4) which has a feed opening(5). The volume ratio of the reservoir to the cavity is 40%. The leakage of the liquid from the mould is prevented by lapping the joining surfaces of the dies. Leakage of the liquid is further prevented by the rim(6) extending from the body of the mould such that the outside surfaces of the rim are exposed to air and are cooled faster than the remainder of the mould. FIG. 2 shows that the external surfaces of the dies are provided with fins/ribs(7) to enhance the cooling efficiency. The mould is hinged(8) to facilitate the opening of the two dies allowing release of the hardened tablet.

The process of the invention will now be described with reference to a comparative example of a conventional process, as well as a non-limiting example of a process according to the invention.

COMPARATIVE EXAMPLE 1

A conventional Process for Preparing Transparent Soap

Figure 3:
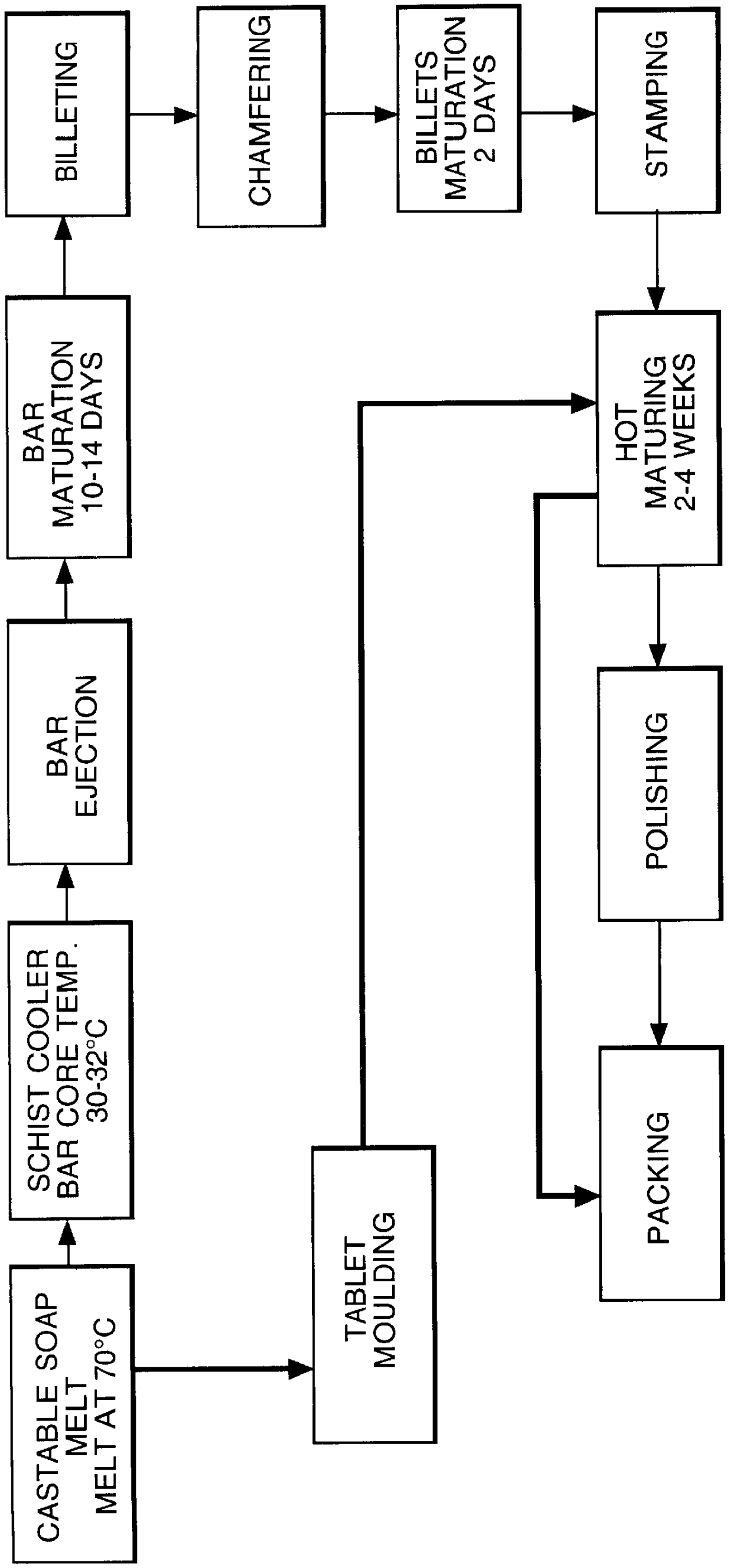
FIG. 3 shows the process steps involved in a conventional process for preparing transparent soap that requires maturation in contrast to the process steps for preparing transparent soap with a mold of the present invention (indicated in bold)

The process steps involved in the conventional process for preparing transparent soap that require maturation are described in FIG. 3 by a block diagram. FIG. 3 shows that the conventional process involved many manufacturing operations such as casting of molten soap into long bars, Schist cooling, bar ejection, bar maturation, billeting, chamfering, billet maturation and stamping to produce individual transparent soap tablets.

EXAMPLE 1

Process to Prepare a Transparent Soap According to the Invention

A mixture containing fatty acids and solvent blend of sucrose, sorbitol and ethanol as given below was mixed in a two litre round bottomed flask. The batch temperature was raised to 80° C. The aqueous solution of sodium hydroxide was added to the mixture to saponify the fatty acids. The batch temperature was maintained at 80° C. so that a clear solution was obtained. The perfume was added at this stage.

The composition of the transparent soap is given below for a typical 1 Kg batch.

| Ingredients | Weight (Grams) |
|---|---|
| Oleic acid | 60 |
| Stearic acid | 75 |
| Palmitic acid | 75 |
| Coconut fatty acid | 90 |
| Sucrose | 250 |
| Sorbitol | 100 |
| Ethanol | 100 |
| Water | 192.6 |
| Sodium hydroxide | 47.4 |
| Perfume | 10 |

Figure 4:
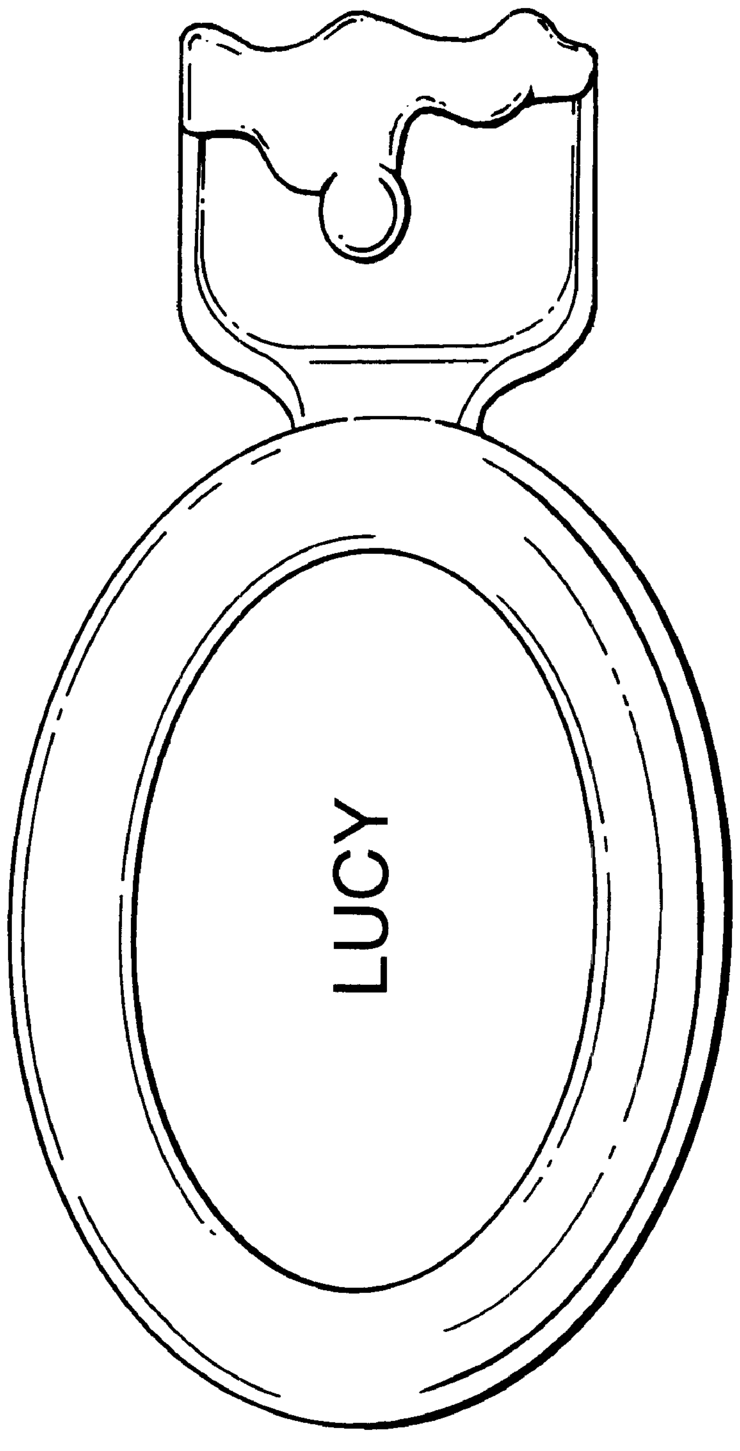
FIG. 4 shows a soap tablet obtained with a mold of the present invention (indicated in bold).

The mould according to the invention was heated to 75° C. in an oven and after taking it out of the oven the molten mixture was poured into the mould such that the reservoir was also filled with the molten solution. The mould was allowed to cool at an air temperature of 25–30° C. for a period of 15 minutes. The two dies of the mould were opened manually and the hardened soap was taken out using a vacuum rubber cup. The soap which got solidified in the reservoir was chopped off and the resultant soap tablet was allowed to mature for 10–12 weeks to obtain required transparency after which it was ready to be packed. The resultant soap tablet did not contain any air bubbles. FIG. 4 shows the soap tablet as it was taken out of the mould.

The process according to the invention described in Example 1 is also indicated in FIG. 3, which illustrates the elimination of several manufacturing operations such as casting of molten soap into long bars, Schist cooling, bar ejection, bar maturation, billeting, chamfering, billet maturation and stamping involved in the conventional process.

What is claimed is:

1. A detergent mould for casting shaped, detergent articles, wherein said mould comprises at least two rigid complimentary dies each of which has a surface which, upon engagement of the dies, define a cavity corresponding to a desired shape of the cast detergent article, wherein said engaged dies further form a reservoir which on one side is open to receive cast melt and, on another side, is open to the cavity;

wherein the volume ratio of the reservoir to the cavity is 5% to about 50%;

wherein the reservoir forms a unit that is removable from the rest of the mould to permit removal of cast melt remaining in the reservoir away from the cast article; and wherein the shaped article which is cast in said mould is a solid article; and wherein the thickness and width of the dies in a region of engagement of at least said two dies is adapted to allow relatively faster cooling of said engagement region than elsewhere.

2. A mould according to claim 1, wherein the volume ratio of the reservoir to the cavity is 10% to about 50%.

3. A mould according to claim 1, wherein the volume ratio of the reservoir to the cavity is 20% to about 50%.

4. A mould according to any claim 1, wherein one or more of the dies contains a mirror image of an inscription desired on the surface of the cast article.

5. A mould according to claim 4, wherein the mirror image is bevelled so as not to be exactly perpendicular to the inner surface of the die.

6. A mould according to claim 1, wherein the dies are hinged.

7. A mould according to claim 1, wherein the dies are provided with fins or ribs or both.

8. A mould according to claim 1, wherein the cavity defining surfaces of the dies are coated with a material having lower surface energy than an article cast within said mould.

* * * * *